(12) United States Patent
Crossman et al.

(10) Patent No.: US 6,913,040 B2
(45) Date of Patent: Jul. 5, 2005

(54) HYDRAULIC FLUID RESERVOIR

(75) Inventors: John Crossman, Rockwood, MI (US); Neil Lauer, White Lake, MI (US); Stuart Dale Barter, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 296 days.

(21) Appl. No.: 10/396,864

(22) Filed: Mar. 24, 2003

(65) Prior Publication Data

US 2004/0187931 A1 Sep. 30, 2004

(51) Int. Cl.$^7$ .................................. F16K 24/00
(52) U.S. Cl. ............... 137/587; 137/549; 137/574; 137/576; 137/171; 60/453; 60/454; 210/130
(58) Field of Search .................. 137/171, 549, 137/574, 576, 587; 210/130; 60/453, 454, 592

(56) References Cited

U.S. PATENT DOCUMENTS

| | | | |
|---|---|---|---|
| 2,078,524 A | | 4/1937 | Ashton et al. |
| 2,483,448 A | * | 10/1949 | Weitzen ...................... 137/203 |
| 2,521,107 A | | 9/1950 | Wiley |
| 3,818,934 A | | 6/1974 | Borsanyi |
| 3,889,705 A | * | 6/1975 | Coderre ...................... 137/171 |
| 4,082,665 A | | 4/1978 | Schneider et al. |
| 4,210,176 A | * | 7/1980 | Emming ...................... 137/574 |
| 4,299,696 A | * | 11/1981 | Rosaen et al. .............. 210/130 |
| 4,424,829 A | * | 1/1984 | Millington et al. ......... 137/574 |
| 4,431,027 A | | 2/1984 | Sabina, Jr. |
| 4,437,986 A | * | 3/1984 | Hutchins et al. ............ 210/130 |
| 4,454,717 A | | 6/1984 | Wade et al. |
| 4,650,572 A | | 3/1987 | Hayes |
| 4,957,629 A | | 9/1990 | Smith et al. |
| 4,964,983 A | | 10/1990 | Abe et al. |
| 5,356,535 A | | 10/1994 | Ueno et al. |
| 5,660,726 A | * | 8/1997 | Dluzik ....................... 210/130 |
| 5,820,356 A | | 10/1998 | Ogbauaku |
| 5,906,221 A | | 5/1999 | Mancell |
| 5,918,760 A | | 7/1999 | Frodin et al. |
| 5,943,861 A | * | 8/1999 | Davison et al. ............. 60/453 |
| 5,957,545 A | | 9/1999 | Sawada et al. |
| 6,035,930 A | | 3/2000 | Schwartz |
| 6,116,454 A | * | 9/2000 | Henderson et al. ......... 137/571 |
| 6,155,336 A | | 12/2000 | Schwartz |
| 6,220,283 B1 | | 4/2001 | Saarinen et al. |
| 6,261,448 B1 | | 7/2001 | Merchant et al. |
| 6,280,617 B1 | | 8/2001 | Brandreth, III |
| 6,286,545 B1 | | 9/2001 | Moy et al. |
| 6,311,724 B1 | | 11/2001 | Tracey et al. |
| 6,382,245 B1 | * | 5/2002 | Ito ............................ 60/454 |
| 6,394,123 B2 | * | 5/2002 | Menu et al. ................ 137/171 |

* cited by examiner

*Primary Examiner*—John Rivell
(74) *Attorney, Agent, or Firm*—Brinks Hofer Gilson & Lione

(57) ABSTRACT

A hydraulic fluid reservoir apparatus for an automotive power steering system comprises a filter chamber, and a filter parallel to a vertical axis and dividing the filter chamber into an upstream region and a downstream region. The reservoir apparatus also includes a stagnant fluid well apart from the filter chamber, and a de-aeration zone overlying the filter chamber. A vent is provided between the upstream region and the de-aeration zone. Fluid recycled to the reservoir apparatus contains entrained gas. The filter separates the gas from the fluid within the upstream region, whereupon the gas is vented to the de-aeration zone and separates from the fluid circulated to the stagnant fluid well.

14 Claims, 4 Drawing Sheets

HYDRAULIC FLUID RESERVOIR

TECHNICAL FIELD OF THE INVENTION

This invention relates to a hydraulic fluid reservoir of the type used in an automotive power steering or the like. More particularly, this invention relates to a hydraulic fluid reservoir that removes and vents entrained gases from circulating hydraulic fluid

BACKGROUND OF THE INVENTION

A typical power steering system in an automotive vehicle comprises a pump that supplies pressurized hydraulic fluid to a steering gear assembly. Fluid is supplied to the pump by a reservoir and is returned to the reservoir from the steering gear assembly. The reservoir commonly includes a filter to remove particulate debris that might otherwise damage the pump or gear assembly.

A problem occurs when air becomes trapped in the hydraulic fluid. Entrained air may cause cavitation in the pump that results in noisy operation. Also, entrained air may interfere with optimum operation of the pump and gear and may even cause damage thereto. One concern involves displacement of the fluid during sharp turns of the vehicle, commonly referred to as sloshing. To provide uninterrupted fluid flow, it is common practice to provide a large and deep volume of fluid within the reservoir and to strategically locate the outlet to assure a continuous supply of fluid despite variations in the liquid level. Another source of entrained air is a attributed to air leakage through seals in the pump and gear assembly. Again, a large and deep volume of fluid allows entrained air to diffuse out before being recirculated. However, the dimensions of the reservoir are dictated by spacial constraints within the engine compartment of the vehicle. Under certain situations, the available space permits only a relatively shallow volume that is not suited for reservoirs of conventional design.

Therefore, a need exists for a hydraulic fluid reservoir that assures a continuous flow of fluid from the reservoir, while removing particulate debris and entrained air from the fluid, without necessitating a large and deep volume of fluid, thereby allowing the size, and particularly the height, of the reservoir to be reduced. In an automotive power steering system, the reservoir needs to remove entrained air and provide an air-free fluid flow despite sloshing that occurs during turns, so as to prevent cavitation or diminished performance in the pump or steering gear assembly

BRIEF SUMMARY OF THE INVENTION

In accordance with this invention, a hydraulic fluid reservoir apparatus for an automotive power steering system comprises a filter chamber and a filter disposed within the filter chamber. The filter is parallel to a vertical axis and divides the filter chamber into an upstream region and a downstream region. The reservoir includes a fluid inlet communicating with the upstream region and a fluid outlet communicating with the downstream region. The reservoir also includes a stagnant fluid well apart from the filter chamber. A port is provided to permit fluid communication between the stagnant fluid well and the fluid outlet. The reservoir also includes a de-aeration zone overlying the filter chamber and communicating with the stagnant fluid reservoir. At least one vent communicates with the upstream region and the de-aeration zone. It is found that entrained gas in fluid entering the reservoir through the fluid inlet tends to coalesce in the upstream surface of the filter and is released through the vent to the de-aeration zone. As a result, fluid passing through the filter to the downstream region and then to the fluid outlet is substantially purged or air.

BRIEF DESCRIPTION OF THE DRAWINGS

The invention will be further described with reference to the following drawings wherein.

DETAILED DESCRIPTION OF THE INVENTION

Figure 1:
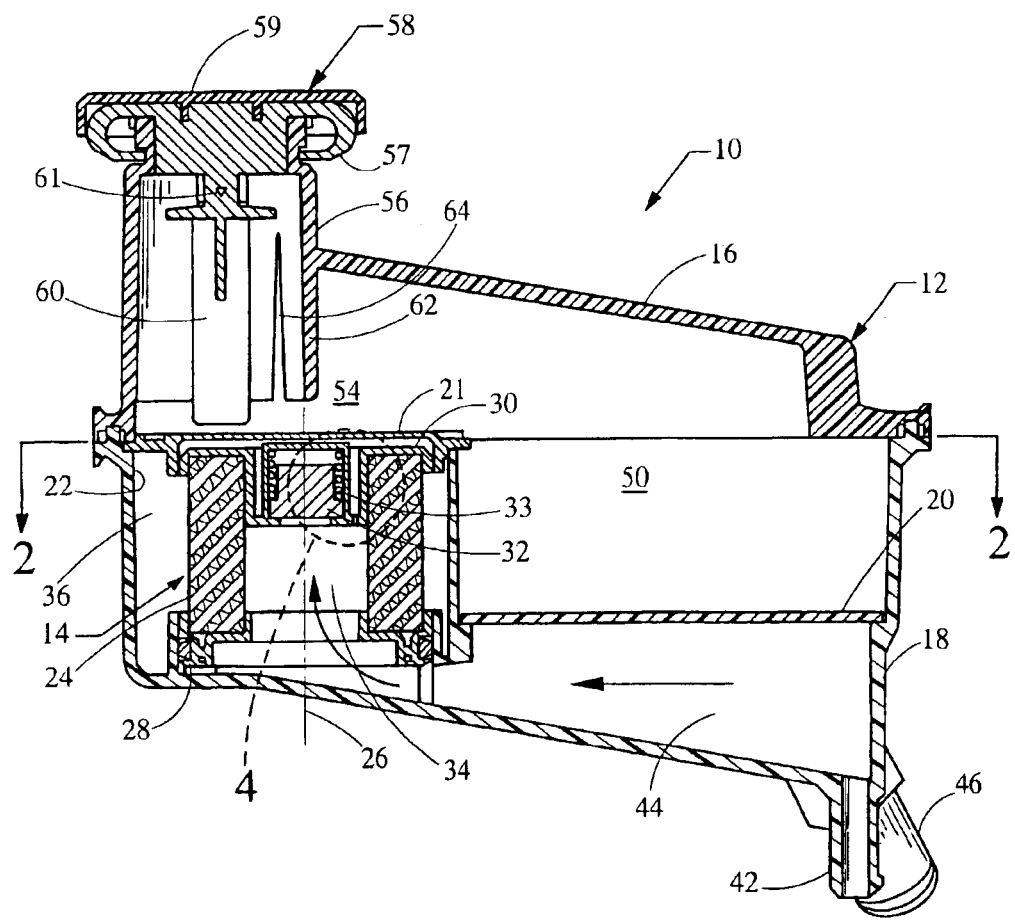
FIG. 1 is a cross-sectional view of a hydraulic fluid reservoir apparatus in accordance with this invention.
Figure 2:
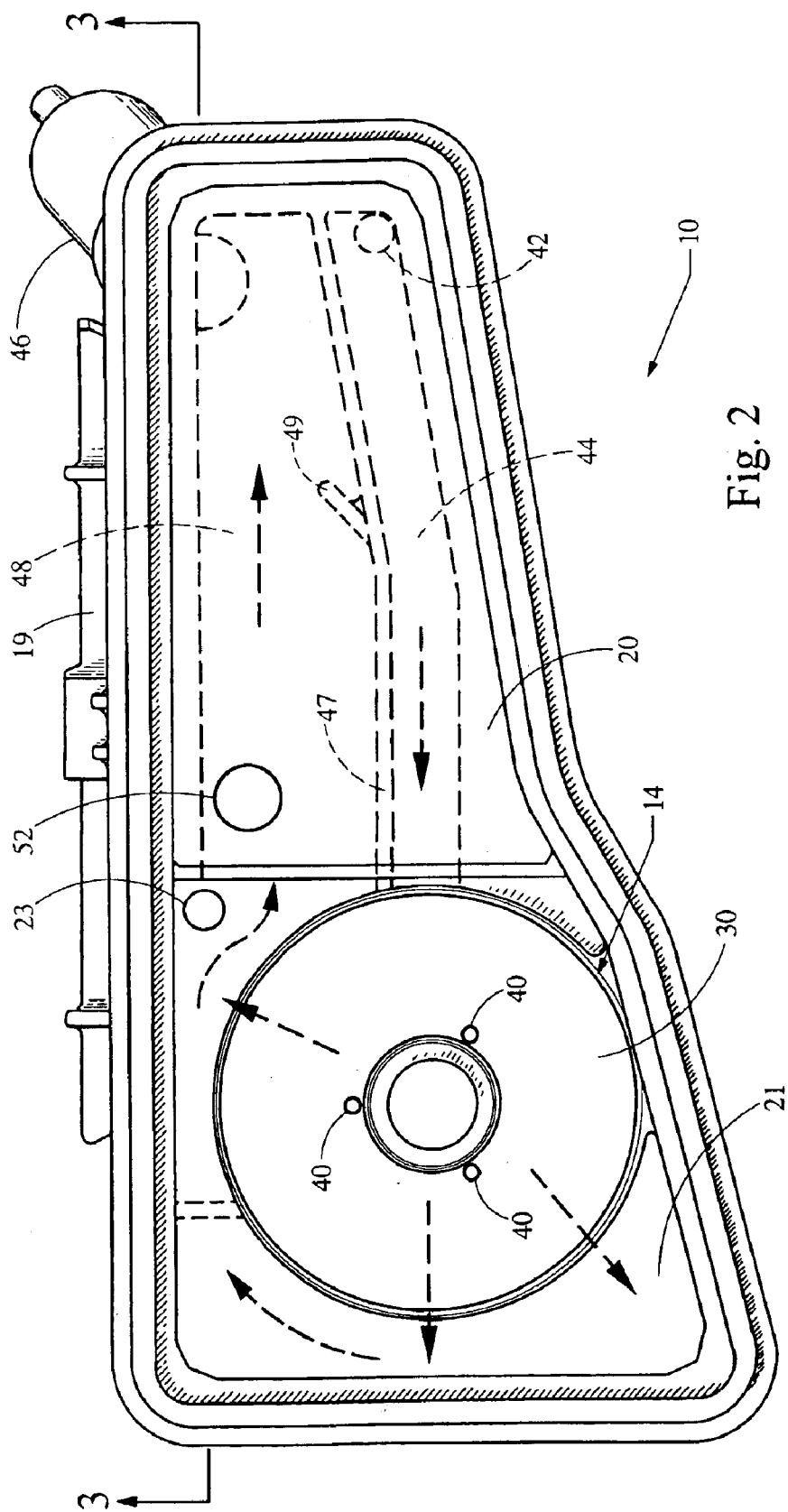
FIG. 2 is a cross-sectional view of the hydraulic fluid reservoir apparatus in FIG. 1, taken along line 2—2 in the direction of the arrows.
Figure 3:
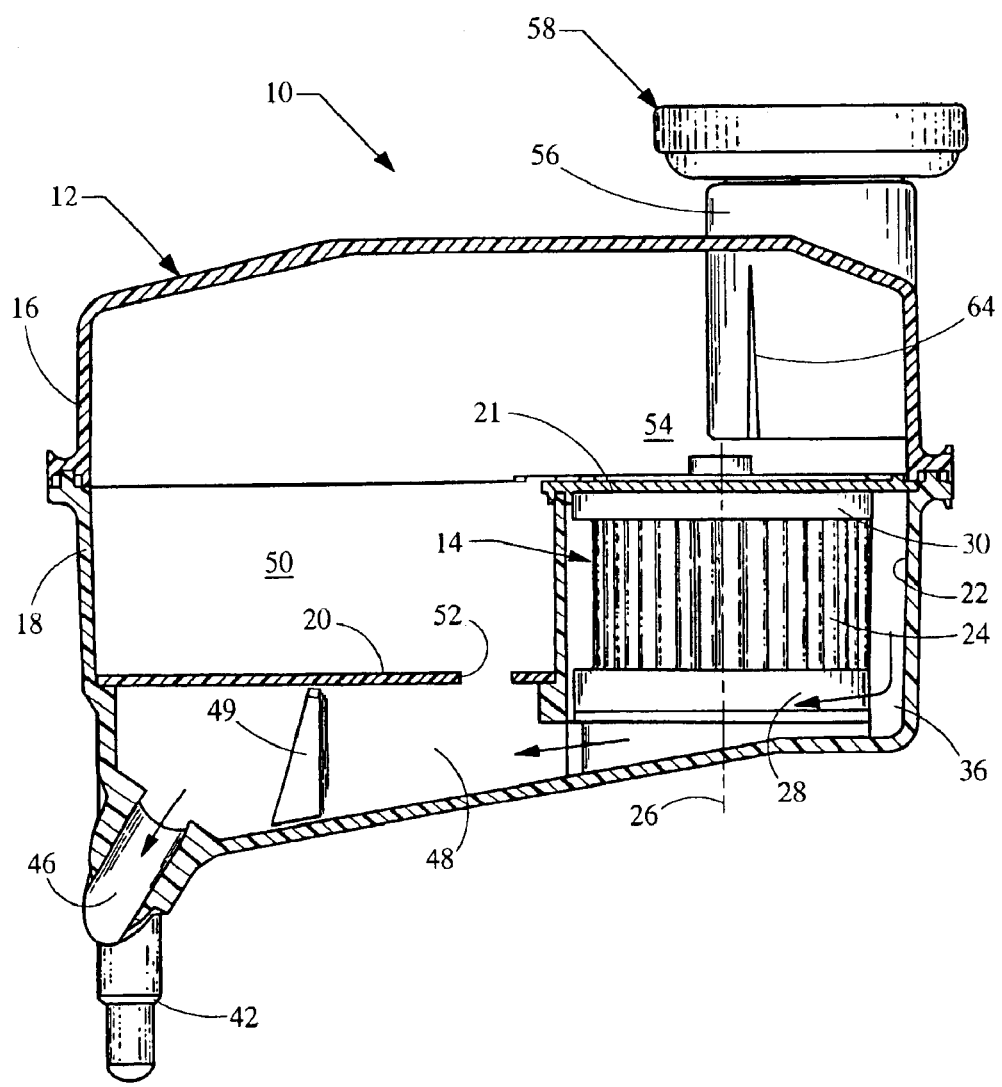
FIG. 3 is a cross-sectional view of the hydraulic fluid reservoir apparatus in FIG. 1, taken along line 3—3 in FIG. 2 in the direction of the arrows.
Figure 4:
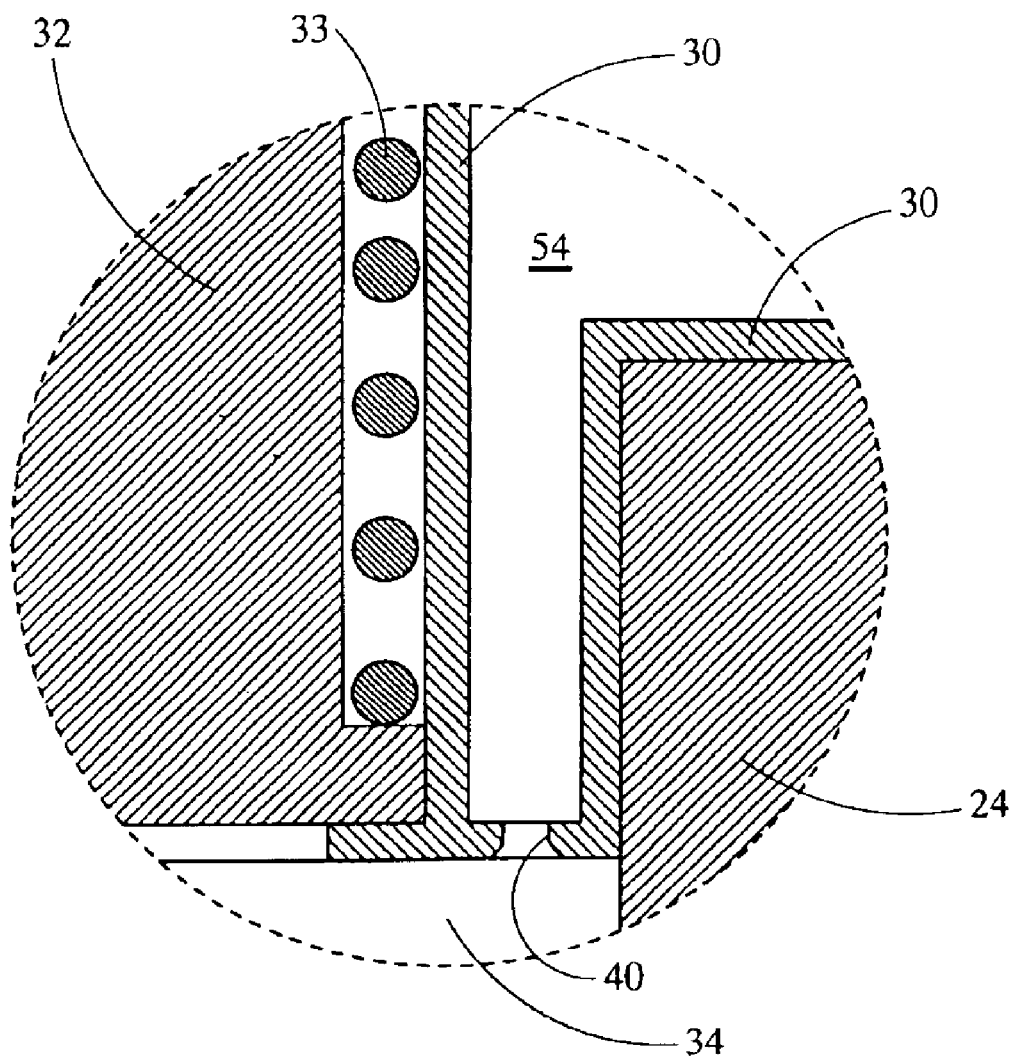
FIG. 4 is an enlarged view of a portion of FIG. 1 within circle 4.

In accordance with a preferred embodiment of this invention, referring to the Figures, a hydraulic fluid reservoir apparatus 10 is adapted for use in an automotive power steering system for supplying hydraulic fluid to a power steering pump and for accumulating fluid that is recirculating from a power steering gear. Reservoir 10 comprises, as main elements, a polymeric housing 12 and a filter assembly 14 assembled within the housing. Housing 12 is formed of an upper section 16 and a lower section 18 that are joined by a peripheral seam weld and includes an integrally molded protrusion for mounting the apparatus onto the vehicle. Housing 12 also includes partitions 20 and 21 that are ultrasonically welded to the lower section 18 prior to seam welding upper section 16. Together with filter assembly 14, upper section 16, lower section 18 and partitions 20 and 21 define the several chambers that characterize reservoir 10.

Filter element 14 is located within a filter chamber 22 defined by lower section 18 and partition 21. A port 23 is provided in partition 21 for admitting fluid to chamber 22 and venting air, for example, during initial fill. Filter assembly 14 comprises a filter 24 generally cylindrical about a vertical axis 26. By way of an example, a filter 24 may be formed of pleated paper, polymeric mesh or metallic screen characterized by an average porosity of about 20 to 50 microns, preferably about 40 microns. In general, a lower porosity, less that about 50 microns, is desired for filtering particulate debris and air bubbles. A porosity less than 20 microns undesirably increases upstream fluid pressure and inhibits the desired fluid flow through the filter, particularly during operation at cold temperatures. It is found that a porosity of about 40 microns is effective for separating air bubbles, while permitting fluid flow through the filter at suitable pressures. For a filter 24 formed of paper, the paper is preferably pleated, with folds extending parallel to axis 26, and is enclosed within a metallic screen for reinforcement. The ends of filter 24 are held within a lower polymeric cap 28 and an upper polymeric cap 30. A pressure relief valve 32 biased by spring 33 is centrally mounted in upper cap 30. In a preferred embodiment, pressure relief valve 32 has an opening pressure of between about 5 and 10 psi, preferably about 7 psi. Filter assembly 14 divides filter chamber 22 into an interior or upstream region 34, which is within filter 24, and a downstream region 36, which is about filter 24 within filter chamber 22. Vents 40 are provided in upper cap 30 for releasing air, as hereinafter described.

Reservoir 10 includes an inlet 42 adapted to be coupled to a hose that is in turn connected to an outlet of a power steering gear assembly for conveying spent hydraulic fluid from the power steering gear assembly to the reservoir. Internally, hydraulic fluid flows from inlet 42 through an inlet passage 44 to upstream region 34 within filter assembly 14. Reservoir 10 also includes an outlet 46 adapted to be coupled to a hose connected to an inlet of a power steering pump for supplying hydraulic fluid to the pump. Internally, fluid flows from downstream region 36 in filter chamber 22 to outlet 46 through an outlet passage 48. Inlet passage 44 and outlet passage 48 extend generally parallel within lower section 18 of housing 12, separated by a wall 47 reinforced by a rib 49, and are enclosed by partition 20. It is an advantage of the preferred embodiment that inlet 42 and outlet 46 are located in proximate relationship at a lower end of housing 12 to facilitate hose connections during installation of the reservoir into an automotive vehicle.

Reservoir 10 further comprises a stagnant fluid well 50 laterally disposed relative to filter chamber 22. Stagnant fluid well 50 is separated from inlet passage 44 and outlet passage 48 by partition 20. A port 52 is provided in partition 20 for supplying fluid from stagnant fluid compartment 50 to outlet passage 48, as needed to supplement the output from reservoir 10 to satisfy the demands of the power steering system.

Reservoir 10 also includes a fill port 56 formed in upper section 16 of housing 12 for introducing hydraulic fluid into the reservoir. For this purpose, fill port 56 is provided with a removable cap 58 that includes a main body 57 and a grip cover 59. Cap 58 includes a dip stick 60 for measuring fluid level within the reservoir and a vent 61 that communicates with the ambient atmosphere. Fill port 56 includes a splash guard 62 to reduce splashing of the fluid towards cap 58. A slot 64 is provided in splash guard 62. During operation, gas from upper regions of housing 12, including overlying stagnant fluid well 50, vents through slot 64 and vent 61 in cap 58 to prevent a pressure build-up within the reservoir and accommodate variations in fluid volume due to temperature fluctuations.

In accordance with this invention, reservoir 10 comprises a de-aeration zone 54 for separating air bubbles from hydraulic fluid. De-aeration zone 54 overlies filter chamber 22. During use, air bubbles that form within upstream region 34 pass through vents 40 into zone 54, carried by fluid that also flows through the vents. Within zone 54, air bubbles separate from the fluid and rise to the upper regions of the housing. Zone 54 also extends over well 50, so that, as fluid flows into the well, additional time is provided for the bubbles to rise and separate. It is an advantage of the preferred embodiment that fill port 56 is strategically located over the de-aeration zone to facilitate the accumulation of air adjacent the fill port and venting of excess air through cap 58 into the atmosphere.

For use, inlet 42 is coupled to a hose for receiving hydraulic fluid from a power gear assembly, and outlet 46 is coupled to a hose for supplying fluid to a power steering pump. During operation, the temperature of the hydraulic fluid tends to increase from an initial cold state to a hot state, representative of normal engine operation. As the temperature increases, the viscosity of the hydraulic fluid decreases and promotes flow through the reservoir. In general, during normal operation at hot conditions, a predominant portion of hydraulic fluid received at inlet 42 flows through inlet passage 44 to upstream region 34, passes through filter 24, and flows from downstream region 36 through outlet passage 48 to outlet 46. Particulate debris in the fluid is removed as the fluid passes through filter 24. A portion of the fluid flows from upstream region 34 through vents 40 into fill chamber 54 and into stagnant fluid well 50. To assure a continuous supply of fluid to outlet 46 sufficient to satisfy the demands of the power steering system, fluid is drawn from stagnant fluid well 50 through port 52 into outlet passage 48 and mixes with fluid from downstream region 36. In accordance with this invention, it has been found that entrained air is separated from the filter 24 prior to passing to the downstream region. The entrained air coalesces at the inner surface of the filter medium and the resulting bubbles are carried through vents 40 by the minor portion of fluid that flows therethrough. Within de-aeration zone 54, the bubbles tend to rise and separate from the fluid. The air accumulates in the upper region of upper section 16 and vents through vent 61 in cap 58 as necessary to prevent a pressure build up within the reservoir. It is desired that fluid flow through vents 40 be sufficient to purge nascent air bubbles from upstream region 34 while maximizing fluid flow through filter medium 24. In a preferred embodiment, the cumulative size of vents 40 is designed to convey between about 5 and 15 percent of the fluid from upstream region 34 under hot operating conditions, with the balance passing through filter 24 into downstream region 36.

Under cold conditions representative of initial operation, the increase viscosity of the hydraulic fluid inhibits flow through filter medium 24. This may increase fluid flow through vents 40 and increase the volume of fluid drawn from stagnant fluid well 50 through port 52. Under typical cold-start conditions, the pressure in upstream region 34 does not require opening of pressure relief valve 32. However, under extreme cold conditions, typically less than about minus 10° C., because of the high viscosity of the fluid, fluid flow through medium 24 may be restricted and cause a pressure buildup within upstream region 34 to open pressure relief valve 32. Fluid flows past valve 32 into fill chamber 54 and then into stagnant fluid well 50. Fluid flow through port 30 into outlet passage 48 assures a continuous supply to the outlet for supplying the power steering system under such cold conditions.

Therefore, this invention provides a hydraulic fluid reservoir wherein a substantial portion of hydraulic fluid that enters the reservoir through the inlet is passed through the filter medium and is recirculated to the outlet. In the preferred embodiment, at least 85 percent, and more preferably at least 90 percent, of the fluid is recirculated from the inlet directly to the outlet through the filter medium in this manner. In addition, the reservoir includes a supply of stagnant fluid that may be drawn as needed and mixed with the recirculated fluid to assure a continuous supply of fluid to the outlet to meet the demands of the power steering system. By directly recirculating the major portion of the fluid and drawing upon the stagnant fluid only as needed, the reservoir eliminates the need for a large and deep volume of fluid. This allows the depth of reservoir fluid to be reduced, thereby permitting the overall height of the reservoir to be decreased. The reservoir includes a filter medium that removes particulate debris from the recirculating fluid. In addition, it is found that the filter assembly also removes entrained gases from the input fluid. Gas may be entrained, for example, as a result of air leakage past seals in the power steering pump or power steering gear assembly. It is found that the gas bubbles coalesce within the upstream region of the filter and are carried by the minor portion of fluid that flows through the vents into the fill chamber. Thereafter, the gas bubbles separate from the fluid as the fluid flows into the stagnant fluid well and downward to the port to the outlet passage. Accordingly, the reservoir of this invention assures a continuous supply of fluid, and also minimizes the air content in the output fluid, thereby reducing cavitation and damage to other components of the power steering system. Thus, this invention reduces noise within the power steering system and extends the useful life of the components thereof.

In the described embodiment, the filter assembly comprises a pleated filter medium cylindrical about a vertical axis. Alternately, the filter medium may be planar or have another suitable shape that divides the upstream region and downstream region and is parallel to the vertical axis to allow air bubbles forming on the filter medium surface to rise and be vented from the filter chamber. Cylindrical filters of the type described are readily commercially available and are preferred. Pleating is preferred to increase the surface area and reduce upstream fluid pressure during operation.

While this invention has been described in terms of certain embodiments thereof, it is not intended to be so limited but rather only to the extent set forth in the claims that follow.

What is claimed is:

1. A hydraulic fluid reservoir apparatus for an automotive power steering system, comprising:
   a filter chamber;
   a filter medium disposed within the filter chamber parallel to a vertical axis and dividing said filter chamber into an upstream region and a downstream region;
   a fluid inlet communicating with said upstream region;
   a fluid outlet communicating with said downstream region;
   a stagnant well apart from the filter chamber and comprising a port communicating with said fluid outlet;
   a de-aeration zone overlying the filter chamber and communicating with said stagnant fluid well; and
   at least one vent communicating between the upstream region and said de-aeration zone and adapted for venting gas filtered from fluid by said filter from said upstream region into said de-aeration zone.

2. A hydraulic fluid reservoir apparatus in accordance with claim 1 wherein the filter medium is generally cylindrical about the vertical axis.

3. A hydraulic fluid reservoir apparatus in accordance with claim 1 further comprising a fill port overlying the filter chamber.

4. A hydraulic fluid reservoir apparatus in accordance with claim 1 comprising one or more vents cumulatively sized to circulate at least 5 percent of fluid in said upstream region to said stagnant well under hot operating conditions.

5. A hydraulic fluid reservoir apparatus in accordance with claim 4, wherein the vents circulate between about 5 and 15 percent of the fluid in said upstream region.

6. A hydraulic fluid reservoir apparatus in accordance with claim 1 wherein the de-aeration zone extends over the stagnant fluid well.

7. A hydraulic fluid reservoir apparatus for an automotive power steering system, comprising:
   a polymeric housing defining a filter chamber;
   a filter element disposed within the filter chamber and comprising a filter medium generally cylindrical about a vertical axis and defining an upstream region interior to the filter medium and a downstream region about said filter medium within said filter chamber;
   said polymeric housing further defining:
      a fluid inlet communicating with said upstream region;
      a fluid outlet;
      an outlet passage for conveying fluid from said downstream region to said fluid outlet;
      a stagnant fluid well overlying said outlet passage and comprising a port communicating with the outlet passage;
      a de-aeration zone overlying the filter element and communicating with said stagnant fluid well for delivering fluid thereto; and
      a vent communicating between said upstream region and said de-aeration zone, whereby gas filtered from fluid by said filter medium within said upstream region is vented through said vents to said de-aeration zone.

8. A hydraulic fluid reservoir apparatus in accordance with claim 7 wherein the stagnant fluid well is disposed laterally relative to the filter chamber.

9. A hydraulic fluid reservoir apparatus in accordance with claim 7 wherein the de-aeration zone extends to overlying the stagnant fluid well.

10. A hydraulic fluid reservoir apparatus in accordance with claim 7 wherein polymeric housing further comprises a fill port overlying the filter chamber, and wherein said hydraulic fluid reservoir further comprises a cap closing said fill port and having a vent for venting gas to ambient atmosphere.

11. A hydraulic fluid reservoir apparatus in accordance with claim 7 wherein said fluid inlet is adjacent said fluid outlet and further comprising an inlet passage parallel to said outlet passage for conveying fluid from said inlet to said upstream region.

12. A hydraulic fluid reservoir apparatus in accordance with claim 7 comprising a plurality of vents cumulatively sized to circulate between about 5 and 15 percent of fluid from said upstream region to said stagnant well under hot operating conditions.

13. A hydraulic fluid reservoir apparatus in accordance with claim 7 wherein the filter is characterized by an average porosity between about 20 and 50 microns.

14. A hydraulic fluid reservoir apparatus in accordance with claim 7 wherein the filter medium is pleated.

* * * * *